Jan. 31, 1967   J. Z. CERYCH ETAL   3,302,075
CAPACITOR WITH SPACERS BETWEEN ELECTRODES FILLED WITH
ELECTROLYTE AND METHOD FOR MAKING SAME
Filed July 10, 1964

INVENTORS
JOHN Z. CERYCH
WAYNE ETTER

BY
ATTORNEY

United States Patent Office 3,302,075
Patented Jan. 31, 1967

3,302,075
CAPACITOR WITH SPACERS BETWEEN ELECTRODES FILLED WITH ELECTROLYTE AND METHOD FOR MAKING SAME
John Z. Cerych and Wayne Etter, Indianapolis, Ind., assignors to P. R. Mallory & Co., Inc., Indianapolis, Ind., a corporation of Delaware
Filed July 10, 1964, Ser. No. 381,828
14 Claims. (Cl. 317—230)

The present invention relates to electrolytic capacitors and more particularly relates to means and methods for providing electrolyte for capacitors having paper-metal foil sections.

The subject of electrolytic capacitors has occupied a great deal of technical literature on electrical components for the last half century. The largest proportion of the research on the subject has been concerned with electrolytes which make possible the utilization of electrolytic capacitors under a wide variety of conditions without any significant loss of properties, and without causing corrosion of the capacitor structure. At the present time, practically all electrolytic capacitors employ etched and formed anodes, generally of a valve metal, such as aluminum and tantalum, "formed" meaning the metal used for the anode has been oxidized to produce a very thin dielectric coating in accordance with conventional procedures known in the art.

The early aluminum electrolytic capacitors employed "wet" electrolytes which generally consisted of solutions of inorganic salts, bases or acids in water. The "wet" electrolytes have been replaced in part with the so called "dry" electrolytes which generally consist of highly viscous solutions of boric acids and/or borates dissolved in a polyhydroxy alcohol such as ethylene glycol, and including a minor amount of water. While the "dry" electrolytes represent a substantial improvement over the "wet" electrolytes, electrolyte impregnation with the highly viscous solutions presents a number of problems. It is difficult to evenly control the electrolyte impregnation, and it is particularly difficult to penetrate large cartridges, thus necessitating long impregnation cycles which do not consistently distribute the electrolyte evenly throughout the capacitor cartridges. Contamination of the electrolyte is a further problem with the impregnation method. Therefore, a longstanding need has existed for providing an improved means of dispersing electrolyte in electrolytic capacitors. The present invention meets that need by providing a means wherein the electrolyte is encapsulated and incorporated with the spacer material and released by pressure during the winding process pressure applied to the wound capacitor, or heat after the capacitor has been wound and sealed.

Therefore, it is an object of the present invention to provide an improved means for electrolyte dispersion in aluminum electrolytic capacitors.

It is an object of the present invention to provide a pelletized electrolyte for electrolyte dispersion in aluminum electrolytic capacitors.

It is an object of the present invention to provide temperature or pressure sensitive electrolyte pellets for electrolyte dispersion in aluminum electrolytic capacitors.

The present invention in another of its aspects, relates to novel features of the instrumentalities of the present invention described therein for teaching the principal object of the present invention and to the novel principles employed in the instrumentalities whether or not these features and principles may be used in the said object or in the said field.

With the aforementioned objects enumerated, other objects will be apparent to those possessing ordinary skill in the art. Other objects will appear in the following description, appended claims and appended drawings. The invention resides in the novel construction, combination, arrangement, and cooperation of elements as hereinafter described and more particularly as defined in the appended claims.

The appended drawings illustrate several novel and different embodiments of the present invention and are constructed to function in the most advantageous mode devised for the practical application of the basic principles involved in the hereinafter described invention.

Generally speaking, the present invention provides a means for dispersing electrolyte in aluminum electrolytic capacitors by applying electrolyte containing capsules or a gelled electrolyte to the capacitor paper before winding. The capsules may be pressure sensitive so that they rupture and disperse electrolyte during the winding process, the capacitor may be loosely wound and pressure applied to the wound capacitor, or they may be temperature sensitive. When temperature sensitive capsules are utilized, the capacitor is wound, sealed and placed into an oven having a temperature above the melting point of the encapsulant. When the encapsulant melts, the electrolyte disperses throughout the capacitor. A third alternative consists of impregnating the capacitor paper with an electrolyte which subsequently gels. The impregnated paper is then wound with the aluminum foil to form a capacitor.

Figure 1:
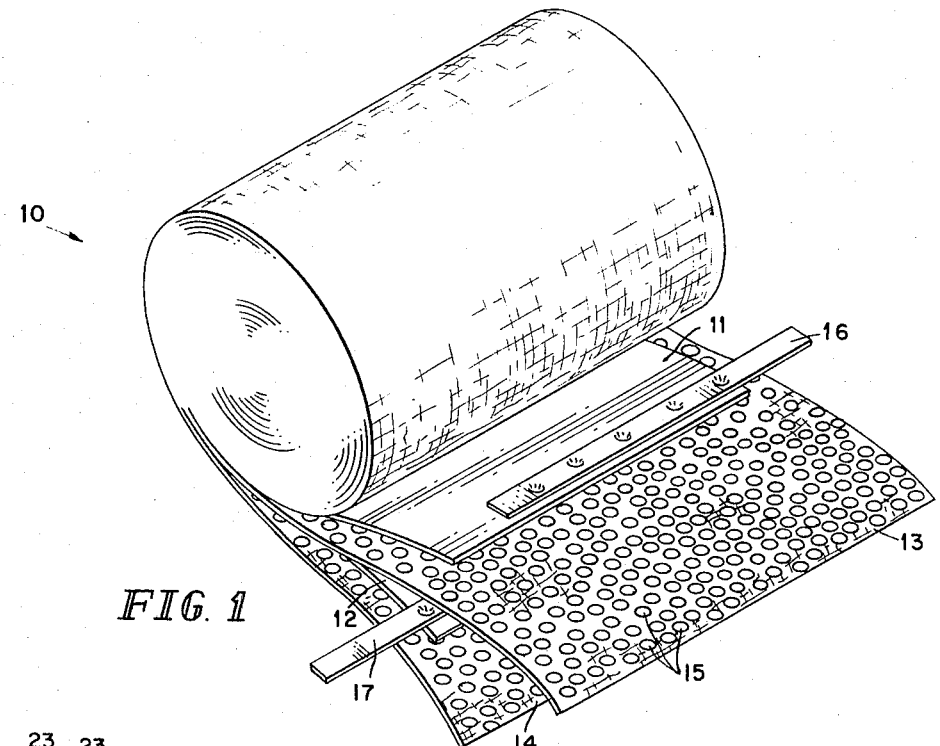
FIGURE 1 is a perspective view of a partially wound electrolytic capacitor body to which the present invention is applicable.

Referring now to the drawings, FIGURE 1 shows an electrolytic capacitor of the wound foil type denoted generally by reference numeral 10. Capacitor 10 comprises anode 11 of film-forming metal having on its surface an oxide film which functions as the active dielectric for the capacitor. Cathode 12 may be composed of either a film-forming metal or a relatively inert metal depending upon the capacitor application and its requirements. Anode 11 and cathode 12 are separated by spacer strips 13 and 14 composed of paper or other porous material. Spacers 13 and 14 have attached thereto electrolyte containing capsules generally designated by reference number 15.

Capsules 15 may be either pressure sensitive or temperature sensitive, in the case of pressure sensitive capsules, the capsules release electrolyte upon winding, or capacitor 10 is loosely wound and pressure is applied thereafter to rupture capsules 15 and disperse the electrolyte. In the case of temperature sensitive capsules, the capsules remain intact during the winding process. After the wound capacitor is sealed, the finished capacitor unit is placed in an oven and heated to a temperature above the melting point of the encapsulant, thereby releasing electrolyte. The encapsulant is of such a composition that it does not interfere with the operation of the capacitor.

A third way of eliminating the electrolyte impregnation step consists of impregnating the separating paper with an electrolyte which will subsequently gel. The impregnated paper is then wound with foil to form a capacitor. Electrolytes may be used which either remain in the gel stage or which break down into a liquid with sufficient temperature depending upon the capacitor application.

Figure 2A:
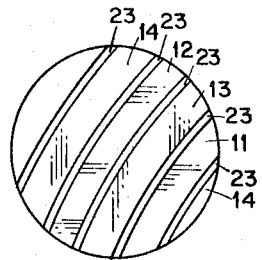
FIGURE 2a is an exploded partial end portion of the capacitor.
Figure 2:
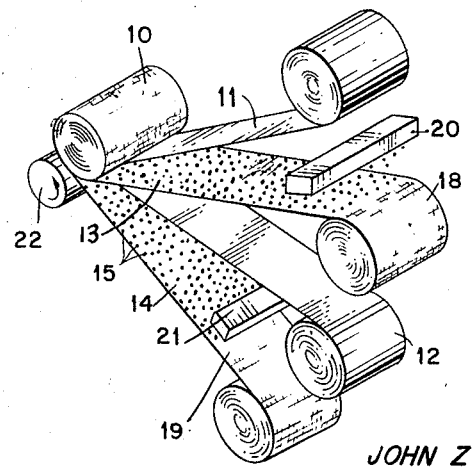
FIGURE 2 is a perspective view of a partially wound capacitor showing the spools of foil, paper and one method of applying the encapsulated electrolyte to the paper.

FIGURE 2 depicts one method of applying capsules 15 to papers 13 and 14. Capacitor 10 is formed from winding anode 11 and cathode 12, anode 11 and cathode 12 being separated by spacer strips 13 and 14. Spacer strips 13 and 14 are fed from rolls 18 and 19. There is positioned in front of feed rolls 18 and 19, spray means 20 and 21 which force the capsules 15 onto strips 13 and 14. For illustrative purposes, we will consider the application of pressure sensitive capsules to papers 13 and 14. As anode strip 11 and cathode strip 12 separated by papers 13 and 14 onto which the capsules 15 have been applied are wound, the pressure exerted by roller 22 is sufficient to release electrolyte from capsules 15. This produces even layers of electrolyte as shown in FIGURE 2a which is an exploded portion taken from section 2—2 of capacitor 10 in FIGURE 2 and wherein alternate layers of anode 11, electrolyte 23, paper 13, electrolyte 23, cathode 12 and paper 14 are shown. The same even electrolyte layer is obtained when temperature sensitive capsules are utilized and the finished capacitor is heated above the melting point of the encapsulant.

The present invention, as hereinbefore described in several of its embodiments, is merely illustrative and not exhaustive in scope. Since many widely different embodiments of the invention may be made without departing from the scope thereof, it is intended that all matter contained in the above description and shown in the accompanying drawings shall be interposed as illustrative and not in a limiting sense.

Having thus described our invention.

We claim:

1. An electrolytic capacitor having oppositely disposed and spaced electrodes, at least one of which comprises a dielectric film formed on the surface thereof, a porous insulative spacer disposed between and separating said electrodes, a myriad of insulative fragments in continuous array coextending with said spacer throughout the area between said electrodes, said fragments being the ruptured walls of electrolyte filled capsules in continuous layer on said spacer, the electrolyte from said capsules in sum permeating said spacer and filling the open spaces between and covering said electrodes.

2. An electrolytic capacitor having oppositely disposed and spaced electrodes, at least one of which comprises a dielectric film formed on the surface thereof, the other of said electrodes being formed from an inert metal, a porous insulative spacer disposed between and separating said electrodes, a myriad of insulative fragments in continuous array coextending with said spacer throughout the area between said electrodes, said fragments being the ruptured walls of electrolyte filled capsules in continuous layer on said spacer, the electrolyte from said capsules in sum permeating said spacer and filling the open spaces between and covering said electrodes.

3. An electrolytic capacitor having oppositely disposed and spaced electrodes having a dielectric film formed on the surfaces thereof, a porous insulative spacer disposed between and separating said electrodes, a myriad of insulative fragments in continuous array coextending with said spacer throughout the area between said electrodes, said fragments being the ruptured walls of electrolyte filled capsules in continuous layer on said spacer, the electrolyte from said capsules in sum permeating said spacer and filling the open spaces between and covering said electrodes.

4. An electrolytic capacitor having a pair of electrodes both of which are composed of film-forming metal and having a dielectric film formed thereon, said film-forming metal selected from the group consisting of aluminum and tantalum, a porous insulative spacer disposed between and separating said electrodes, a myriad of insulative fragments in continuous array coextending with said spacer throughout the area between said electrodes, said fragments being the ruptured walls of electrolyte filled capsules in continuous layer on said spacer, the electrolyte from said capsules in sum permeating said spacer and filling the open spaces between and covering said electrodes.

5. An electrolytic capacitor having a pair of electrodes both of which are composed of film-forming metal foil and having a dielectric film formed thereon, said film-forming metal foil electrodes selected from the group consisting of aluminum and tantalum, a porous paper spacer disposed between and separating said foil electrodes, a myriad of insulative fragments in substantially continuous array coextending with said paper spacer throughout the area between said foil electrodes, said fragments being the ruptured walls of electrolyte filled capsules in a substantially continuous layer on said paper spacer, the electrolyte from said capsules in sum permeating said paper spacer and substantially filling the open spaces between and substantially covering said foil electrodes.

6. An electrolytic capacitor comprising a convolutely wound assembly of a superimposed pair of foil electrodes at least one of which is composed of a film-forming metal having a dielectric oxide film formed thereon, a porous insulative spacer disposed between and separating said foil electrodes, a myriad of insulative fragments in continuous array coextending with said spacer throughout the area between said foil electrodes, said fragments being the ruptured walls of electrolyte filled capsules in continuous layer on said spacer, the electrolyte from said capsules in sum permeating said spacer and filling the open spaces between and covering said foil electrodes.

7. An electrolytic capacitor comprising a convolutely wound assembly of superimposed pair of film-forming metal foil electrodes having a dielectric oxide film formed thereon, said film-forming metal foil electrodes selected from the group consisting of aluminum and tantalum, a porous paper insulative spacer disposed between and separating said foil electrodes, a myriad of insulative fragments in substantially continuous array coextending with said paper spacer throughout the area between said foil electrodes, said fragments being the ruptured walls of electrolyte filled capsules in a substantially continuous layer on said paper spacer, the electrolyte from said capsules in sum permeating said paper spacer and substantially filling the open spaces between and substantially covering said foil electrodes.

8. A method for making an electrolytic capacitor comprising placing a pair of metal strip electrodes, at least one of which carries a dielectric oxide film on its surface, in a loose face-wise assembly with strips of porous insulative spacers alternately disposed therebetween, coiling said assembly into a rolled body of interleaved strip electrodes and spacers, continuously dispensing rupturable capsules of liquid electrolyte onto the surface of said strip spacers during said coiling producing a myriad layer of capsules on the spacers throughout the rolled body, and rupturing said capsules filling the space between the strip electrodes and impregnating the spacers with electrolyte.

9. A method for making an electrolytic capacitor comprising placing a pair of metal strip electrodes, at least one of which carries a dielectric oxide film on its surface, in a loose face-wise assembly with strips of porous insulative spacers alternately disposed therebetween, coiling said assembly into a rolled body of interleaved strip electrodes and spacers, continuously dispensing pressure rupturable capsules of liquid electrolyte onto the surface of said strip spacers during said coiling producing a myriad layer of pressure sensitive capsules on the spacers throughout the rolled body, and rupturing said capsules by applying pressure to said rolled body thereby filling the space between the strip electrodes and impregnating the spacers with electrolyte.

10. A method for making an electrolytic capacitor comprising placing a pair of metal strip electrodes, at least one of which carries a dielectric oxide film on its surface, in a loose face-wise assembly with strips of porous insulative spacers alternately disposed therebetween, coiling said assembly into a rolled body of interleaved strip electrodes and spacers, continuously dispensing temperature rupturable capsules of liquid electrolyte ont othe surface of said strip spacers during said coiling producing a myriad layer of temperature sensitive capsules on the spacers throughout the rolled body, and rupturing said capsules by subjecting said rolled body to elevated temperatures thereby filling the space between the strip electrodes and impregnating the spacers with electrolyte.

11. A method for making an electrolytic capacitor comprising placing a pair of film-forming metal foil electrodes having formed thereon a dielectric oxide film in a loose face-wise assembly with strips of porous insulative spacers alternately disposed therebetween, coiling said assembly into a convolutely wound body of interleaved foil electrodes and spacers, continuously spraying rupturable capsules of liquid electrolyte onto the surface of said strip spacers during said coiling producing a myriad layer of capsules on the spacers throughout the convolutely wound body, and rupturing said capsules filling the space between the foil electrodes and impregnating the spacers with electrolyte.

12. A method for making an electrolytic capacitor comprising placing a pair of film-forming metal foil electrodes having formed thereon a dielectric oxide film in a loose face-wise assembly with strips of porous paper spacers alternately disposed therebetween, said film-forming metal foil electrodes selected from the group consisting of aluminum and tantalum, coiling said assembly into a rolled body of interleaved foil electrodes and paper spacers, continuously dispensing rupturable capsules of liquid electrolyte onto the surface of said strip paper spacers during said coiling producing a myriad layer of capsules on the paper spacers throughout the rolled body, and rupturing said capsules filling the space between the foil electrodes and impregnating the paper spacers with electrolyte.

13. A method for making an electrolytic capacitor comprising placing a pair of film-forming metal foil electrodes having formed thereon a dielectric oxide film in a loose face-wise assembly with strips of porous paper spacers alternately disposed therebetween, said film-forming metal foil electrodes selected from the group consisting of aluminum and tantalum, coiling said assembly into a convolutely wound body of interleaved foil electrodes and paper spacers, continuously dispensing pressure rupturable capsules containing liquid electrolyte onto the surface of said strip paper spacers during said coiling producing a myriad layer of pressure sensitive capsules on the paper spacers throughout the convolutely wound body, and rupturing said capsules by applying pressure to said convolutely wound body thereby filling the space between the foil electrodes and impregnating the paper spacers with electrolyte.

14. A method for making an electrolytic capacitor comprising placing a pair of film-forming metal foil electrodes having formed thereon a dielectric oxide film in a loose face-wise assembly with strips of porous paper spacers alternately disposed therebetween, said film-forming metal foil electrodes selected from the group consisting of aluminum and tantalum, coiling said assembly into a convolutely wound body of interleaved foil electrodes and paper spacers, continuously dispensing temperature rupturable capsules containing liquid electrolyte onto the surface of said strip paper spacers during said coiling producing a myriad layer of temperature sensitive capsules on the paper spacers throughout the convolutely wound body, and rupturing said capsules by subjecting said convolutely wound body to elevated temperatures thereby filling the space between the foil electrodes and impregnating the paper spacers with electrolyte.

References Cited by the Examiner
UNITED STATES PATENTS

| | | | |
|---|---|---|---|
| 1,891,207 | 12/1932 | Ruben | 317—230 |
| 2,051,592 | 8/1936 | Craine | 317—230 |

JOHN W. HUCKERT, *Primary Examiner.*

JAMES D. KALLAM, *Examiner.*